(No Model.)
J. J. GEIGER & I. T. WOOD.
REEL FOR HOLDING WIRE NETTING.
No. 374,357. Patented Dec. 6, 1887.
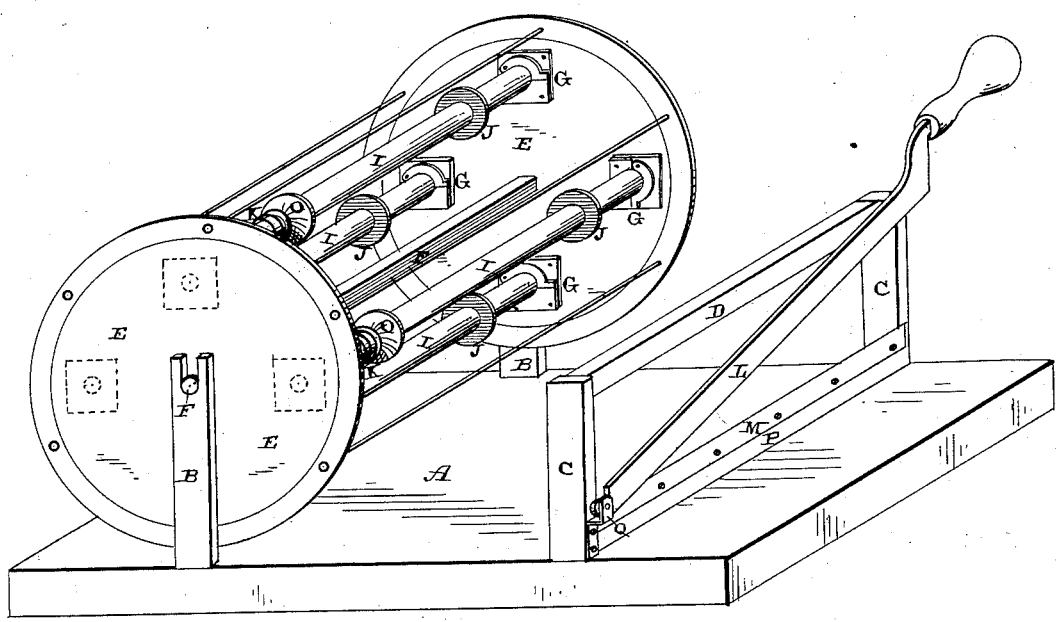
Witnesses.
L. F. Gardner
Edm. P. Ellis.
Inventors.
J. J. Geiger
I. T. Wood,
per F. A. Lehmann, Atty.

UNITED STATES PATENT OFFICE.

JOHN J. GEIGER AND IRVING T. WOOD, OF CLYDE, OHIO.

REEL FOR HOLDING WIRE-NETTING.

SPECIFICATION forming part of Letters Patent No. 374,357, dated December 6, 1887.

Application filed October 11, 1887. Serial No. 252,032. (No model.)

*To all whom it may concern:*

Be it known that I, JOHN J. GEIGER and IRVING T. WOOD, of Clyde, in the county of Sandusky and State of Ohio, have invented a certain new and useful Improvement in Reels for Holding Wire-Netting; and we do hereby declare the following to be a full, clear, and exact description of the invention, such as will enable others skilled in the art to which it pertains to make and use it, reference being had to the accompanying drawing, which forms part of this specification.

Our invention relates to an improvement in reels for holding wire-netting; and it consists in the combination of a revolving reel carrying a number of rollers around which wire-netting is wound, a spring-actuated slide for holding the netting in place upon the rolls, and a knife for cutting off the netting in desired lengths, as will be more fully described hereinafter.

The object of our invention is to provide an apparatus in which wire-netting of different widths can be placed for sale, and in which the reels are arranged in such proximity to a knife or cutter that the netting can be cut off as rapidly as it is drawn off from its roller.

The accompanying drawing represents a perspective of an apparatus embodying our invention.

A represents a suitable base, from which rises suitable standards, B, in which is journaled the shaft F. Near each end of the shaft F is rigidly secured a disk or head, E, and in between these heads or disks E are journaled a number of rollers, I, around which the wire-netting is wound. One end of each of the rollers I is held in a suitable pocket or bearing formed upon the inner side of one of the disks, and the other end is held in a suitable box, G, secured to the inner side of the other disk, and which box is adapted to be opened, so as to allow the roller to be moved at will.

Upon each roller I is rigidly secured a flange or collar, J, against which one end of the wire-netting bears for the purpose of keeping the netting in a direct line with the knife or cutter L. Also upon each roller I is placed a sliding collar, O, which is made automatic by means of a spring, K. These sliding collars O bear against the other end of the netting, and, being made automatic in their action, they adapt themselves to netting of different widths which are placed upon the rollers. By employing the stationary collars J and the automatic sliding collars O the edges of the netting wrapped upon the rollers are kept perfectly straight. Also rising from the base A, at any suitable distance from the standard B, are the two uprights C, which are connected together at their upper ends by a cross-piece, D, and at their lower ends by a cross-piece, P. Secured to this cross-piece P is the lower knife, M, which is stationary. The movable knife L is pivoted upon a plate, Q, which is secured to the end of the cross-piece P. It is only necessary to draw the end of the desired piece of wire-netting through between the knives L M, and then by depressing the knife L the netting can be cut in any desired lengths.

Having thus described our invention, we claim—

The combination of a suitable base, the uprights B, the revolving reel consisting of the heads E and shaft F, the rolls I, journaled between the heads and provided with the stationary collars J and the sliding spring-actuated collars O, and a knife or cutter arranged in such relation to the reel that the material wound upon the rollers I can be cut into any desired lengths as fast as it is drawn from the rollers I, substantially as shown and described.

In testimony whereof we affix our signatures in presence of three witnesses.

JOHN J. GEIGER.
IRVING T. WOOD.

Witnesses:
THOS. P. DEWEY,
M. W. HUNT,
JOHN SHOUP.